United States Patent [19]

Fortson

[11] Patent Number: 5,546,152
[45] Date of Patent: Aug. 13, 1996

[54] MASKING DEVICE FOR CREATING MULTIPLE IMAGE PHOTOGRAPHS

[76] Inventor: Raymond A. Fortson, 7650 Linden, West Bloomfield, Mich. 48324

[21] Appl. No.: 288,493

[22] Filed: Aug. 10, 1994

Related U.S. Application Data

[63] Continuation-in-part of Ser. No. 218,718, Mar. 25, 1994.

[51] Int. Cl.$^6$ ............................................... G03B 11/00
[52] U.S. Cl. ........................................................ 354/296
[58] Field of Search ................................. 354/122, 123, 354/124, 295, 296

[56] References Cited

U.S. PATENT DOCUMENTS

| | | | |
|---|---|---|---|
| D. 234,007 | 12/1974 | Ritter | D61/1 E |
| D. 234,008 | 12/1974 | Ritter | D61/1 E |
| 1,056,588 | 3/1913 | Rusk | 354/295 |
| 1,068,862 | 7/1913 | Digweed | 354/295 |
| 3,122,077 | 2/1964 | Splendore | 354/295 |
| 3,719,128 | 3/1973 | Simmons | 354/295 |
| 3,940,775 | 2/1976 | Bodnar | 354/122 |
| 4,107,716 | 8/1978 | Pfefer | 354/296 |
| 4,124,859 | 11/1978 | Huber | 354/296 |
| 4,137,540 | 1/1979 | Curtis | 354/296 |
| 4,423,939 | 1/1984 | Hayles | 354/122 |
| 4,708,449 | 11/1987 | Thomas | 354/122 |
| 5,073,789 | 12/1991 | Mumpower | 354/122 |

*Primary Examiner*—David M. Gray
*Attorney, Agent, or Firm*—Weintraub DuRoss & Brady

[57] ABSTRACT

A masking apparatus universally adaptable to fit full camera lenses for creating multiple exposure photographs and single exposure photographs, including a masking device insertable within commercial filter holders mountable on a lens of a camera. The masking device having at least three apertures formed therein which are alignable with an exposure area of the lens of the camera. Aperture alignment is accomplished by sliding the masking device within the filter holder until the desired aperture is positioned in the desired location in front of the camera lens.

10 Claims, 3 Drawing Sheets

MASKING DEVICE FOR CREATING MULTIPLE IMAGE PHOTOGRAPHS

CROSS-REFERENCE TO RELATED APPLICATION

This application is a continuation-in-part of application Ser. No. 08/218,718, filed Mar. 25, 1994, entitled "Masking Device for Creating Multiple Image in Photographs", the disclosure of which is hereby incorporated by reference.

BACKGROUND OF THE INVENTION

I. Field of the Invention

The present invention relates generally to devices for creating multiple image photographs. More particularly, the present invention concerns a device for creating a multiple image photograph which is universally adaptable to cameras. Even more particularly, the present invention concerns a device for creating multiple image photographs which is also usable for full single image photographs.

II. Description of the Prior Art

The creating of multiple image photographs is an old and well established art. The traditional devices and methods of producing multiple images on photographic film have used attachments which are mounted to a camera lens. The device to create multiple images and which is usually incorporated within the lens attachment or insertable into the lens attachment, is a mask or screen. The mask commonly has a portion which is open and a portion which is closed. The open portion of the mask permits light to access the lens exposing a first portion of the film that is housed in the camera. The closed portion of the mask seals the second portion of the film from access to the light. When a single full exposure photograph is desired, the devices or the masks must be removed from the camera lens.

Typical lens attachments with masking devices are disclosed in U.S. Pat. Nos. 1,056,588, 1,068,862, 3,122,077, 3,719,128, Des. 234,007 and Des. 234,008. The disclosed lens attachments are uniquely designed to accommodate circular masks having at least one, and usually a single aperture or opening formed therein. The above prior art teaches that the masks may be rotated while attached to the lens, thus placing the opening at the desired position. This permits the operator of the camera to select where the exposed portions will be located on the film.

Other typical lens attachments are found in U.S. Pat. Nos. 3,940,475, 4,107,716, 4,137,540, 4,423,939, 4,708,449 and 5,073,289 which disclose unique square or rectangular lens attachments designed to accommodate specific masks with one or more openings formed therein. Typically, the masks are housed in dedicated lens attachments and are insertable into the lens attachments to produce the desired multiple image exposure on a portion of the film in the camera. To change exposure positions on the film, one mask is removed from the attachment and another mask is inserted into the attachment to expose another portion of the film. Additionally, the above prior art teaches that some masks have multiple openings which are re-positioned within the lens attachment when a new exposure position is desired.

U.S. Pat. No. 4,124,859, on the other hand, discloses a unique circular lens attachment which uses a replaceable mask. The references teach that when a change in an exposure position on film is desired, the mask in the attachment is replaced by another mask. The art further teaches that the opening in the mask can be any shape.

Each of the above cited prior art references teach that each holding device or lens attachment for housing the masking device is uniquely designed to accommodate the particular masking device housed therein. Therefore, the masking devices are not interchangeable from one lens attachment to another. To use the masking device, the user must incur the expense of purchasing an entire masking system which includes the masking device and the lens attachment unique to that masking device. Also, these device packages are not interchangeable between cameras of different manufacturers. Therefore, camera users who use multiple cameras of different makes incur the expense of purchasing a masking system for each camera or carrying more than one camera if different masking devices are required.

The above transferability problem was addressed in the above-referenced co-pending application and which discloses a masking device that is housed in an apparatus that is adaptable to commercial filter holders and interchangeable between different makes of cameras. However, if only a single camera is available, the masking device must be removed from the camera lens in order to take full exposure single image photographs with the camera. The time used to remove the device or apparatus may result in the user or operator losing a desired full exposure shot.

Thus, a masking device which is designed to be adaptable to commercial filter holders that is interchangeable between different makes of cameras with or without an adaptor is greatly desired. Also, a masking device which would be usable with commercially available filter holders that are interchangeable between cameras would reduce the number of lens attachments and cameras required and the associated expense. Further, a masking device which would permit the camera to be used for all pictures masked and unmasked, without removing the masking device from the camera lens would reduce delays caused by removing and installing the masking device and make a single camera available for shooting a desired picture at any time. It is to this to which the present invention is directed.

SUMMARY OF THE INVENTION

The present invention addresses the problems encountered with creating a multiple image photograph as well as a single image photograph without removing the multiple image equipment from the camera and without a large investment in expensive lens attachments and masking devices. The present invention provides an apparatus attachable to a camera for exposing photographic film to create either multiple images or single full exposure images on a single frame and which is universally adaptable to many commercially produced lens filter attachments. The apparatus hereof generally comprises:

(a) a masking device for masking a portion of a camera lens which exposes light to film in the camera, the masking device having a first aperture, a second aperture and a third aperture formed therethrough, the first aperture, the second aperture and the third aperture being within the parameters of an exposure area of the camera lens, at least one aperture providing a full exposure aperture; and (b) means for mounting the masking device to a lens of a camera.

The means for mounting the masking device and the lens of the camera cooperate to expose light on the film within the camera to create a multiple image or a single fully exposed image on the film. The masking device is preferably rectangular and preferably made from plastic, but may be made from metal such as aluminum. The masking device is insertable into the means for mounting the masking device.

The means for mounting the masking device is preferably a commercially available filter holder which is attachable to the lens of the camera which is used to hold other devices in addition to the masking device. The filter holder may be attachable to most any size lens with or without the use of an adaptor. The masking device is insertable into the filter holder and removable from the filter holder while the filter holder is mounted to the lens of the camera.

The apertures of the masking device are positionable within the filter holder by sliding the masking device to properly position the desired aperture within the exposure area in front of the camera lens. The first and third apertures complement each other and cooperate to produce a multiple image photograph. The second aperture provides for a full lens exposure to photograph an unmasked image.

The present invention will be better understood with reference to the following detailed discussion and to accompanying drawings wherein like reference numerals refer to like elements and in which:

DETAILED DESCRIPTION OF PREFERRED EMBODIMENTS

Figure 1:
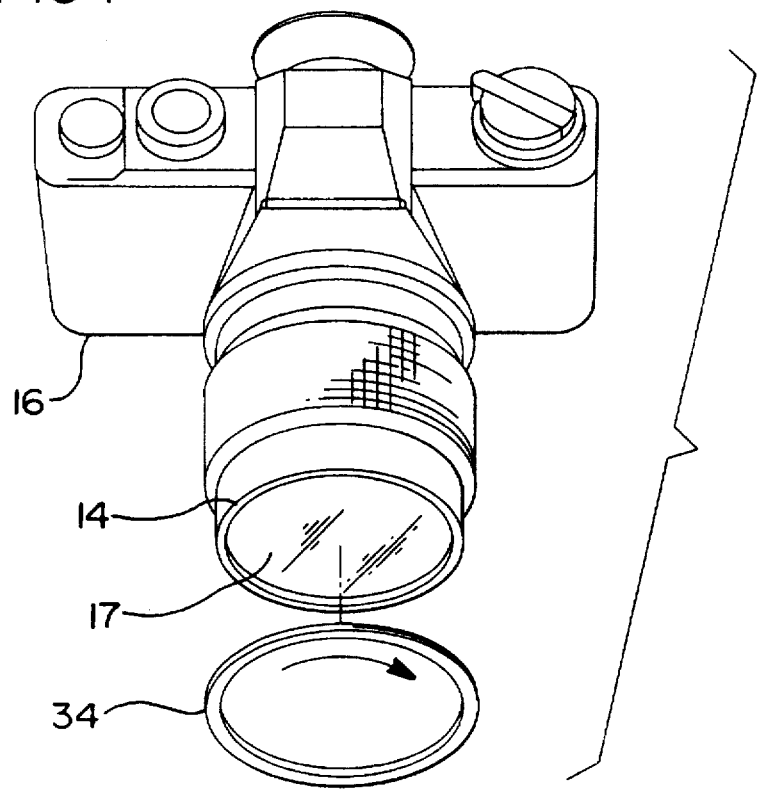
FIG. 1 is an exploded perspective view of a camera, a lens and an adaptor for use in the present invention.

Now with reference to the drawings, there is depicted therein an embodiment of a masking device 18 as well as a masking apparatus in accordance with the present invention, which utilizes the device 18. The apparatus, which is generally denoted at 10, creates either multiple image photographs or full image photographs (not shown). The apparatus 10 is attachable to a lens 14 of a camera 16 and comprises:

(a) the masking device 18 which masks at least a portion of the camera lens 14 which exposes light to film in the camera 16, the masking device 18 comprising a planar member having a first aperture 20, a second aperture 22 and a third aperture 23 formed therein; and (b) means for mounting 24, the means for mounting mounts the masking device 18 to the lens 14 of the camera 16.

The masking device 18 is slidable within the means 24 to align either: (a) the first aperture 20 with the exposure area 17; (b) the second aperture 22 with the exposure area 17; or (c) the third aperture 23 with the exposure area 17.

Preferably, the aperture 20 is within the parameters of the exposure area 17 of the camera lens when a first partial exposure is made and the third aperture 23 is within the parameters of the exposure area 17 of the camera lens 14 when a different second partial exposure is made. The aperture 22 is within the parameters of the exposure area 17 of the camera when a full exposure is made. Of course, the actual arrangement of the apertures is not critical hereto; only, that at least one aperture provide full lens area exposure.

The aperture 22 is preferably a circular opening corresponding to the full exposure area 17 of the camera lens 14. The circular opening permits the user of the camera to select the aperture 22 to shoot an unmasked image when desired. The aperture may be any shape, such as square, triangular, etc. as long as no portion of the full exposure area 17 of the lens is masked.

The masking device 18, the means 24 for mounting and the lens 14 of the camera 16 cooperate to expose a subject 25 to create a multiple image or a single full exposure image on a film (not shown) installed in the camera 16. The camera, of course, must be of the type which enables multiple imaging on a frame of film.

Figure 3:
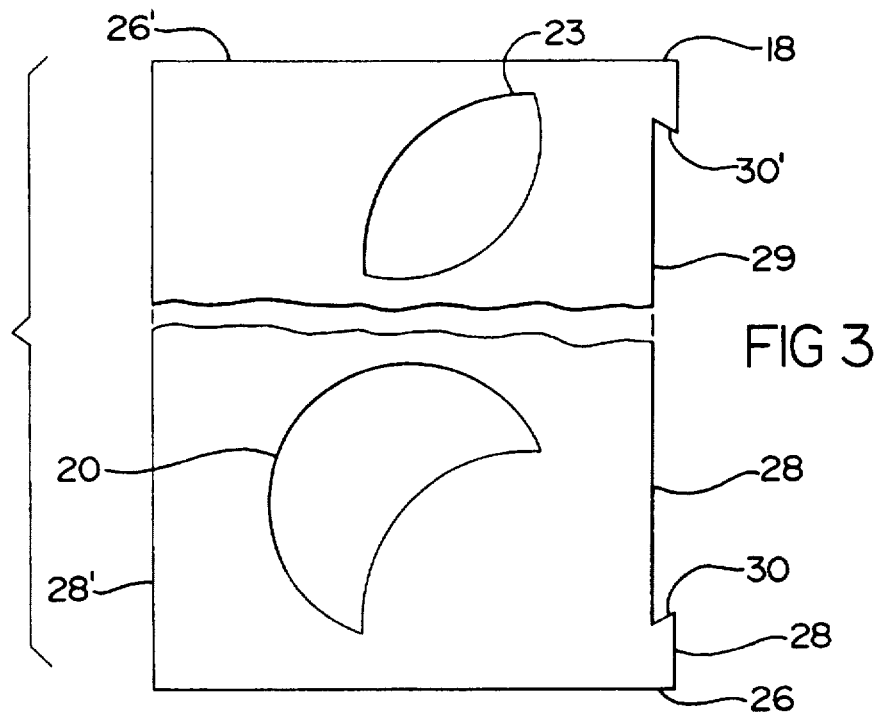
FIG. 3 is a partial plan view of the masking device showing the masking apertures.
Figure 4:
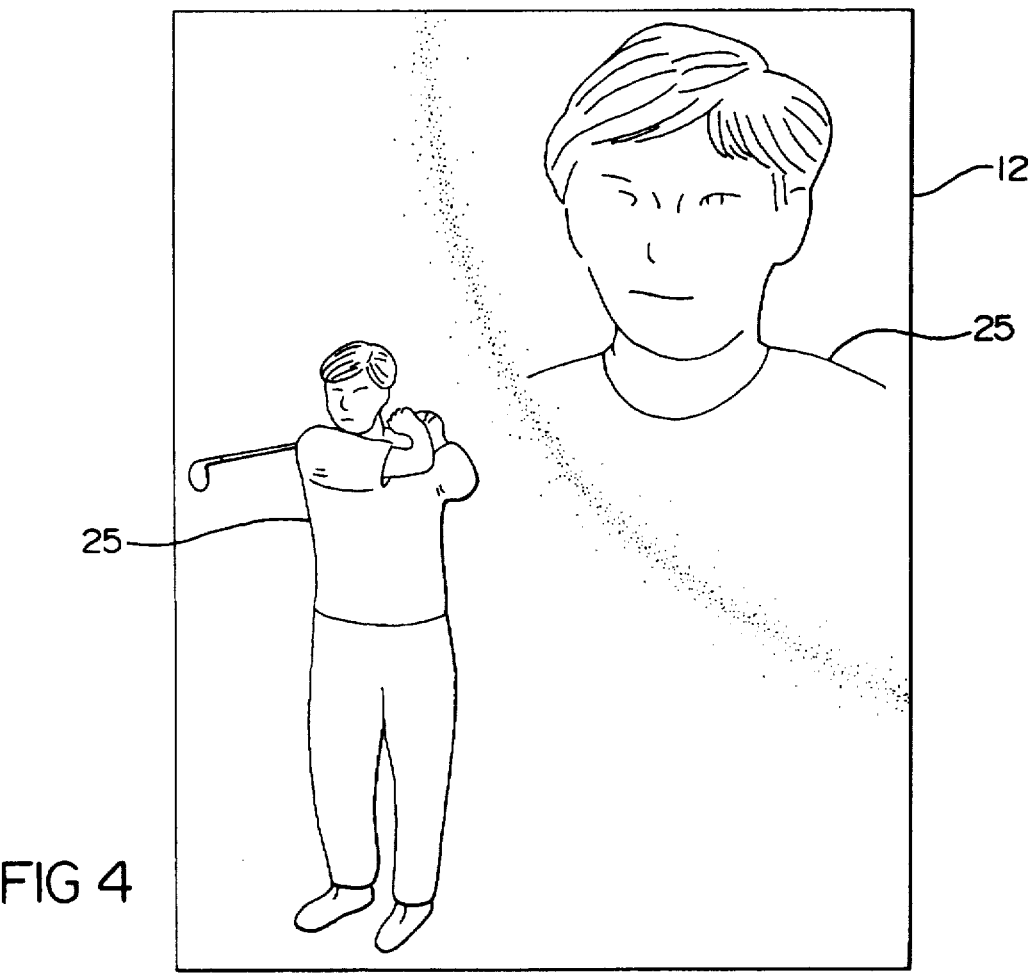
FIG. 4 is a front view of a photograph produced according to the present invention.

As shown in FIGS. 3 and 4, exposures made through the first aperture 20 and the third aperture 23 are reproduced as a multiple image photograph 12.

Figure 5:
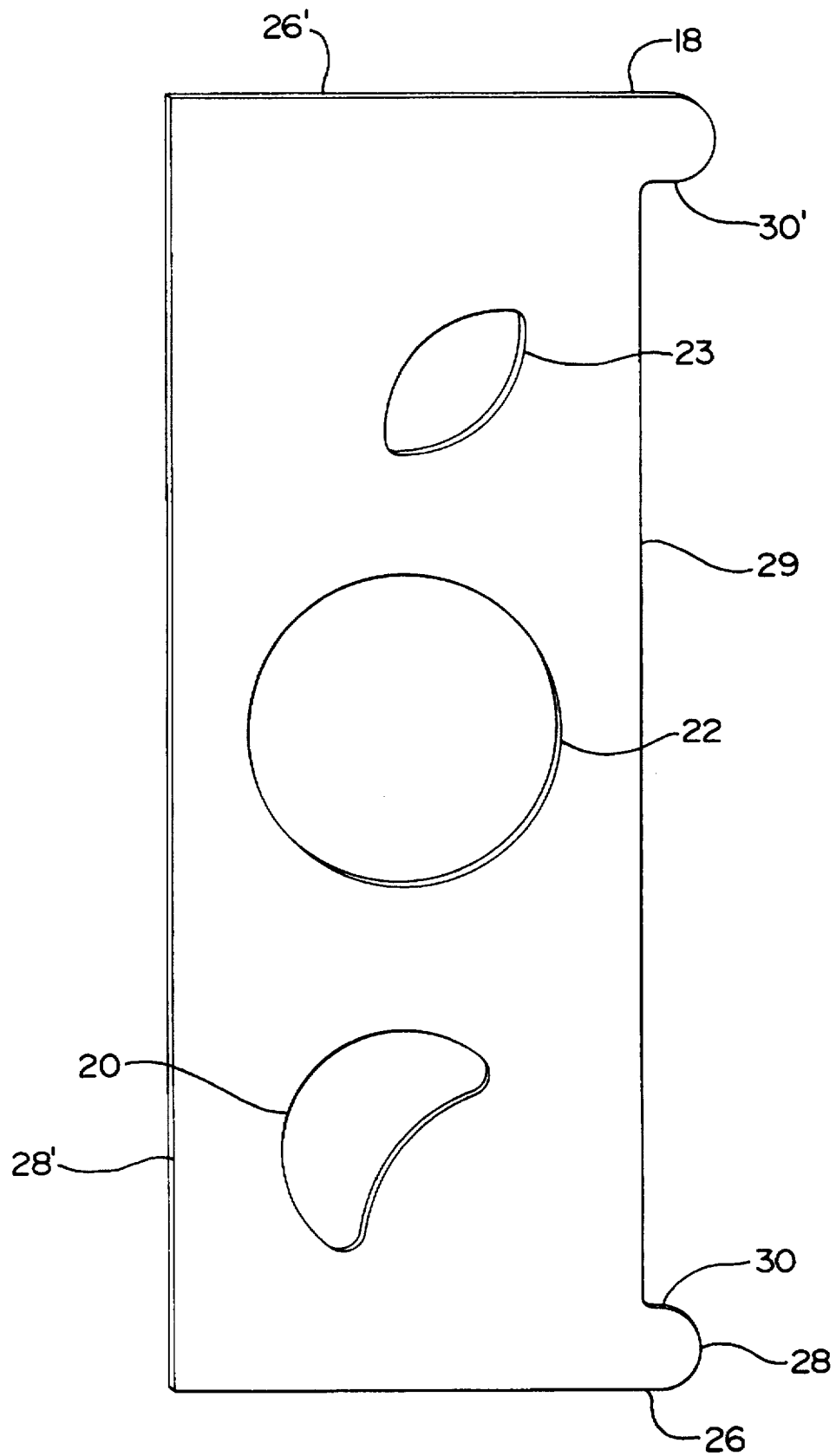
FIG. 5 is a plan view of the masking device of the present invention.

As shown in FIG. 5, the masking device 18 is preferably rectangular in shape. Also, the masking device 18 is preferably made from plastic but may be made from a metal such as aluminum or any other suitable material.

The preferred embodiment of the masking device 18 and has three apertures 20, 22, 23 formed therethrough but may have any number of apertures. The first aperture 20 is preferably different in shape than the third aperture 23 such that the first and third apertures 20, 23, respectively, mask different portions of the exposure area 17 of the camera lens 14, but complement each other and cooperate to produce a full exposure area multiple image photograph 12. However, the same shape may be used for the apertures 20 and 23, if desired. The aperture 22 is different in shape than the apertures 20, 23 and makes the full exposure area 17 of the camera lens 14 available for exposing a subject to produce the single image photograph.

As shown in FIG. 3, the first aperture 20 is essentially a crescent shaped cut-out portion. The third aperture 23 is essentially an oval shape, but in any case the third aperture 23 is the shape of that portion of the exposure area 17 of the lens 14 not exposed to the first aperture 20, i.e. the two portions cooperate to define a full exposure area.

The masking device 18 has a first end 26, an opposing second end 26', an elongated first side 28 and an opposing elongated second side 28'. The side 28 of the masking device 18 is defined by an elongated notch or cut-out section 29 formed therein. The elongated notch 29 is bracketed by a first stop 30 proximate the first end 26 and an-opposing second stop 30' proximate the second end 26', as detailed subsequently. As subsequently detailed, the width of the device 18 between sides 28, 28' is substantially equal to the width of the means for mounting 24.

Figure 2:
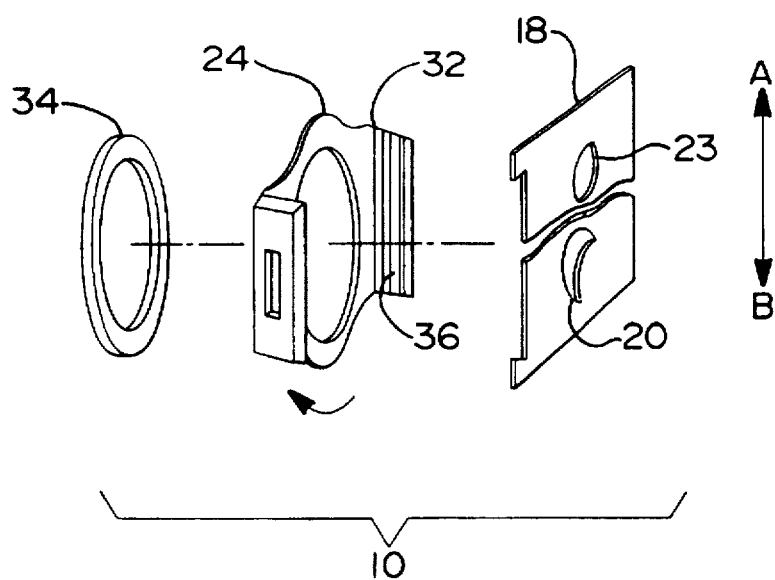
FIG. 2 is an exploded, broken perspective view of an embodiment of the apparatus of the present invention.

As shown in FIG. 2, the masking device 18 is insertable into the means for mounting 24. The means for mounting 24 is preferably a commercial filter holder such as a Cokin Creative Filter System which is commercially available and universally adaptable to any standard or non-standard camera lens 14 by using adaptor rings 34, in the well known manner.

The filter holder 32 has a pair of spaced side walls 33, 33', each having at least one groove 36, 36' formed therein to slidingly receive and hold the masking device 18 therein during use. The grooves 36, 36' may also hold other devices such as filters or other masking devices such as disclosed in the above-referenced co-pending application.

To produce a multiple image photograph as desired, the masking device 18 is slid in direction "A" (FIG. 2) until the stop 30 urges against the filter holder 32. This positions the first aperture 20 such that a first portion of the exposure area 17 is accessible and the second portion of the exposure area 17 is masked. After the film has been exposed, the masking device 18 is slidable in the opposite direction "B" until the stop 30' urges against the filter holder 32. This positions the third aperture 23 such that the second portion of the exposure area 17 is accessible and the first portion is masked. To produce a single image photograph as desired, the masking device 10 is centered in the filter holder 32 aligning the second aperture 22 with the camera lens 14 such that the full exposure area 17 of the lens 14 is exposed.

In use, the means for mounting 24 the masking device 18 is attached to the lens 14 of the camera 16 by using an adaptor 34 if the means for mounting 24 is not capable of being directly attachable to the camera. After the means 24 is attached to the lens 14 and if a multiple image photograph is desired, the masking device 18 is then positioned within the means for mounting 24 by placing the desired aperture 20 or 23 within the exposure area 17 of the lens 14. An operator then positions the camera 16 on a desired subject 25 and operates the camera 16 to expose the subject 25 to the film within the camera. After the first exposure is made, the masking device 18 is repositioned within the means 24 for mounting to permit another aperture 20 or 23 to be positioned within the exposure area 17 of the lens 14. The operator then positions the camera 16 and operates the camera 16 to expose the subject 25 to the film within the camera 16. Thus, a multiple exposure is created on the film within the camera 16 which, when developed, results in a multiple exposure photograph 12.

However, if a full unmasked single image photograph is desired, the operator positions the masking device 18 within the means for mounting 24 to align the second aperture 22 with the camera lens 14. The operator positions and operates the camera 16 to expose the subject 25 to the film within the camera 16. Thus, a single full image exposure is created on the film within the camera 16 which, when developed, results in a single full exposure photograph.

The masking device 18 and the means for mounting 24 are universally adaptable and usable on a large number of commercial cameras and lenses, thus substantially reducing the need for several cameras and several pieces of expensive equipment. Also, the device 18 permits taking full exposure photographs and multiple image photographs without removal of the device from the camera, further reducing the need for multiple cameras and lost photo opportunities. Additionally, the cost of acquiring and using a masking apparatus is greatly reduced.

Alternatively, and although not shown, a lens may cover the first, second and third apertures 20, 22, 23. The lens may be a specialty lens or a filter such as frosted or colored glass. Alternatively, the masking device 18 may be used with independent filters which are insertable in the means 24 for mounting the masking device 18 along with the masking device 18.

Having described the present invention, what is claimed is:

1. An apparatus attachable to a camera for use with a camera lens for creating multiple image and single image photographs, the apparatus comprising:
   (a) a masking device for masking a portion of the camera lens, the masking device comprising:
      (i) a first end and an opposing second end;
      (ii) an elongated first side and an opposing elongated second side connecting the first end and the opposing second end;
      (iii) an elongated notch formed in one of the opposing elongated sides of the masking device, the elongated notch being bracketed by a first stop proximate the first end and an opposing second stop proximate the opposing second end;
      (iv) a first aperture which reveals a first portion of a camera lens;
      (v) a second aperture which reveals a second portion of a camera lens; and
      (vi) a third aperture which reveals a third portion of a camera lens;
   (b) means for mounting the masking device to a camera, the masking device being slidably mounted to the means for mounting; and
   wherein the masking device is slidable between a first position which enables the first aperture to reveal a first portion of a camera lens, a second position which enables the second aperture to reveal a second portion of a camera lens, a third position which enables the third aperture to reveal a third portion of a camera lens, the first aperture revealing a first partial exposure area, the second aperture revealing a full exposure area and the third aperture revealing a second partial exposure area and wherein the first stop and the second stop cooperate with the means for mounting to align the apertures.

2. The apparatus of claim 1, wherein the means for mounting the masking device comprises:
   a filter holder attachable to the lens of the camera, the filter holder having a pair of spaced apart grooves formed therein, the masking device being slidable in the grooves.

3. The apparatus of claim 2 further comprising:
   an adaptor for attaching the filter holder to the lens of a camera.

4. The apparatus of claim 1 wherein one aperture is a crescent shaped aperture.

5. The apparatus of claim 4 wherein one aperture is a circular shaped aperture.

6. The apparatus of claim 5 wherein one aperture is an oval shaped aperture.

7. A planar photographic masking device for creating a single or multiple image on a film frame comprising:
   (a) a first end and an opposing second end;
   (b) an elongated first side and an opposing elongated second side connecting the first end and the opposing second end;
   (c) an elongated notch formed in one of the opposing elongated sides of the masking device, the elongated notch being bracketed by a first stop proximate the first end and an opposing second stop proximate the opposing second end;
   (d) first, second and third apertures, a first of the apertures providing a full exposure area, a second of the apertures providing a first partial exposure area, which is less than the full exposure area, and the third of the apertures providing a second partial exposure area different from the first partial exposure area and less than the full exposure area, the second and third apertures cooperating to provide a multiple image film frame when used; and
   wherein the first stop and the opposing second stop ensure proper alignment of the apertures.

8. The masking device of claim 7 wherein:
   the second and third apertures are complementary and cooperate to define a full exposure area.

9. The masking device of claim 7 which further comprises:
   a first stop disposed at a first end of the member and a second stop axially spaced apart from the first stop and disposed at a second end of the member.

10. The device of claim 9 which further comprises:
   a lens holder which attaches to a camera; the lens holder having a pair of spaced apart side walls, each side wall having a groove formed therein; and wherein the device is slidably disposable in the grooves.

* * * * *